US007562029B2

(12) United States Patent
Majd et al.

(10) Patent No.: US 7,562,029 B2
(45) Date of Patent: *Jul. 14, 2009

(54) INTEGRATED PROJECT MANAGEMENT AND DEVELOPMENT ENVIRONMENT FOR DETERMINING THE TIME EXPENDED ON PROJECT TASKS

(75) Inventors: Mahdad Majd, Rochester, MN (US); John Mathew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/866,274

(22) Filed: Oct. 2, 2007

(65) Prior Publication Data

US 2008/0021757 A1    Jan. 24, 2008

Related U.S. Application Data

(63) Continuation of application No. 10/142,467, filed on May 9, 2002, now Pat. No. 7,286,999.

(51) Int. Cl.
*G05B 19/418* (2006.01)
(52) U.S. Cl. .......................................... 705/8
(58) Field of Classification Search ................. 705/8
See application file for complete search history.

(56) References Cited

U.S. PATENT DOCUMENTS

| 4,818,162 | A | | 4/1989 | Zukowski et al. |
| 4,875,162 | A | | 10/1989 | Ferriter et al. |
| 5,016,170 | A | | 5/1991 | Pollalis et al. |
| 5,301,270 | A | | 4/1994 | Steinberg et al. |
| 5,765,140 | A | * | 6/1998 | Knudson et al. ............... 705/9 |
| 5,907,490 | A | | 5/1999 | Oliver |
| 6,513,154 | B1 | | 1/2003 | Porterfield |
| 6,519,763 | B1 | * | 2/2003 | Kaufer et al. ............... 717/101 |
| 6,662,357 | B1 | | 12/2003 | Bowman-Amuah |
| 6,968,360 | B1 | | 11/2005 | Morrow et al. |
| 7,051,036 | B2 | | 5/2006 | Rosnow et al. |
| 7,069,498 | B1 | | 6/2006 | Finch et al. |
| 7,092,895 | B2 | | 8/2006 | Chappel et al. |
| 7,139,999 | B2 | | 11/2006 | Bowman-Amuah |

(Continued)

FOREIGN PATENT DOCUMENTS

WO        0125909        4/2001

(Continued)

OTHER PUBLICATIONS

HMSSoftware.ca Web Pages Jan. 2000, Retreived from Archive.org Feb. 12, 2007.*

(Continued)

*Primary Examiner*—Scott L Jarrett
(74) *Attorney, Agent, or Firm*—Patterson & Sheridan, LLP

(57) ABSTRACT

Method, apparatus, and article of manufacture for managing a task of a project in an integrated development environment. The task typically includes a plurality of events. In one aspect, the method includes receiving a set of data from a project management tool, the set of data including an identifier corresponding to the task. A process of the task associated with the identifier is then managed.

15 Claims, 5 Drawing Sheets

U.S. PATENT DOCUMENTS

| | | | |
|---|---|---|---|
| 7,212,987 | B2 | 5/2007 | Swanke et al. |
| 7,286,999 | B2 * | 10/2007 | Majd et al. ...................... 705/8 |
| 2002/0143594 | A1 | 10/2002 | Kroeger |
| 2003/0169230 | A1 * | 9/2003 | DeVito ....................... 345/156 |

FOREIGN PATENT DOCUMENTS

WO        WO 01/25909 A2 *   4/2001

OTHER PUBLICATIONS

Microsoft Project 2000 for Windows Product Enhancements Guide Microsoft, Oct. 1999.*

Use Quattro Pro to track billable hours on a daily timesheet Inside Corel WordPerfect Suite, vol. 6, No. 2, Feb. 2000.*

Vandersluis, Chirs, It's about time—time management that is Computing Canada, vol. 22, No. 24, Nov. 21, 1996.*

Job time tracking software The Candian Manager, vol. 21, No. 4, Winter 1996.*

Feibus, Andy, Automated Time-Trackers Information Week, vol. 742, Jul. 5, 1999.*

Torzolini, Susan, Primaver debuts timesheet profession as time-keeping front end to P3 PR Newswire, Jun. 18, 1996.*

Wu, Ching-Seh et al., Software Project Planning Associate (SPPA): A Knowledge-Based Approach for Dynamic Software Project Planning and Tracking, IEEE 2000.*

Pyron, Tim et al., Special Edition Using MS Project 2000 Que, Sep. 27, 2000.*

Wu, Ching-she, Software project plan tracking intelligent agent Texas A&M University, 2000, AAT 9994370.*

Dick Simmons et al., "Manager Associate," IEEE Transactions on Knowledge and Data Engineering Archive, Jun. 1993, vol. 5(3): pp. 426-438.

Larry Whipple, "Visualizing a New World," Databased Web Advisor, Jul. 1997 vol. 15(7).

Dick Simmons et al., "Software Measurement—A Visualization Toolkit," 1998 Prentice Hall, ISBN: 0-13-840695-2.

Gerhard Chroust et al., "The Role of Work Management in Application Development," IBM Systems Journal, 1990 vol. 29(2): pp. 189-208.

Harvey Levine, "Rescuing Developers from Deadline Drudgery," Software Magazine, Jul. 1990 vol. 10(9): pp. 67-75.

Darrell S. Corbin, "Establishing the Software Development Environment," Journal of Systems Management, Sep. 1991 vol. 42(9): pp. 28-31.

Chris Lalli, "IDE Introduces First Software Process Management Tool Tied Directly to Object-Oriented Analysis," Business Wire, May 7, 1996.

"Job Time Tracking Software," The Canadian Manager, Winter 1996 vol. 21(4): p. 30.

"Systemcorp Announces PMOffice, A New Web-Based Enterprise Project Management Solution," PR Newswire, Dec. 7, 1998.

"Time Control Offers Better Support for Projects," Computer Dealer News, Dec. 9, 1999, vol. 15(48): p. 44.

Herb Bethoney, "Project 2000 Keeps Teams in Focus," eWeek, May 15, 2000.

Gary Hilson, "Watching the Clock," Computing Canada, Feb. 1, 2002, vol. 28(3).

Primavera Project Planner—Planning and Control Guide Version 3.0, Primavera Systems, Inc. 1999.

Microsoft Project 2000 for Windows Product Enhancement Guide, Microsoft Corporation, Oct. 1999.

HMSSoftware.ca Web Pages, Hueristic Management Systems, May-Dec. 2000, Retrieved from Archive.org Feb. 12, 2007.

Tim Pyron, "Special Edition Using Microsoft Project 2000 Que," Sep. 2000, ISBN:0-7897-2253-4.

Ching-Seh Wu et al., "Software Project Planning Associate (SPPA)," 24th International Computer Software and Applications Conference, IEEE Computer Society, Oct. 2000, pp. 305-310.

Ching-Seh Wu et al., "Software Project Plan Tracking Intelligent Agent," Texas A & M University, Dissertation, Dec. 2000, AAT 9994370.

* cited by examiner

FIG. 5A

| 510 | 520 | 530 | 540 | 550 | 560 | 570 | 580 |
|---|---|---|---|---|---|---|---|
| TASK NAME | EVENT IDENTIFIER | DATE | DESCRIPTION OF TASK | STATUS OF TASK | HIGHLIGHTING COLOR | TOTAL DURATION | VALIDATION FLAG |

| 515 | 525 | 535 | 545 | 555 |
|---|---|---|---|---|
| EVENT IDENTIFIER | START TIME | END TIME | DURATION FOR THIS INVOCATION | TOTAL DURATION |

505

INTEGRATED PROJECT MANAGEMENT AND DEVELOPMENT ENVIRONMENT FOR DETERMINING THE TIME EXPENDED ON PROJECT TASKS

CROSS-REFERENCE TO RELATED APPLICATIONS

This is a continuation of U.S. patent application Ser. No. 10/142,467 filed May 9, 2002 now U.S. Pat. No. 7,286,999, which is herein incorporated by reference.

BACKGROUND OF THE INVENTION

1. Field of the Invention

The present invention generally relates to integrated development environments. More particularly, the present invention relates to managing projects in integrated development environments.

2. Description of the Related Art

In an Integrated Development Environment (IDE), computer developers or programmers use a program editor to write computer programs and develop software applications in the form of source code. The source code is conventionally written in a high-level programming language, e.g., C++, Java, Pascal, and the like. To run such computer programs in a computer system, a compiler program must convert the source code into executable code or object code.

Most projects in the IDE could be viewed as broken down into tasks, such as, debugging, documentation or testing. Each task is typically assigned to a developer to complete the task. As with other working environments, a project manager is typically assigned to oversee the completion of the entire project. His responsibility includes, among other things, identifying which tasks are critical (i.e., in a critical path or behind schedule), which developers are assigned to which tasks, and how much time has been invested in each task.

Often times, the project manager uses tools, such as a project management tool, to assist the project manager in managing his project. A project management tool is a software application that assists the project manager to manage his projects. More specifically, the tool allows the project manager to keep track of the tasks within a project. Current project management tools, however, require the project manager to manually input the data relating to the tasks. Manually inputting these data from day to day can often be a cumbersome task.

A need therefore exists for an improved method and apparatus for managing projects in integrated development environments.

SUMMARY OF THE INVENTION

Embodiments of the present invention are generally directed to methods, articles of manufacture and computers for managing tasks of a project in an integrated development environment. A task may comprise a plurality of events. In one aspect, a set of data is received from a project management tool. The set of data includes an identifier corresponding to a task. Once the set of data is received, an amount of time expended on the task associated with the identifier is measured. That amount of time is then transferred to the project management tool.

In one embodiment, the present invention is directed to a signal bearing medium comprising a program, which when executed by a processor, performs an operation for managing a task of a project in an integrated development environment. The operation comprises: receiving a set of data from a project management tool. The set of data includes an identifier corresponding to the task. The method further comprises: measuring a amount of time expended on the task associated with the identifier; and transferring the amount of time to the project management tool.

In another embodiment, the present invention is directed a computer that includes a memory containing an integrated development environment task-management program. The computer further includes a processor which, when executing the integrated development environment task-management program, performs an operation, which comprises: receiving a set of data from a project management tool. The set of data includes an identifier corresponding to the task. The operation further includes: measuring a amount of time expended on the task associated with the identifier; and transferring the amount of time to the project management tool.

In yet another embodiment, the present invention is directed to a computer program product, which comprises a project management tool configured to perform a method of collecting project management information. The method comprises: 1) receiving a plurality of task identifiers for a project; and 2) automatically associating an event with at least one of the plurality of task identifiers. The computer product further comprises a signal bearing media bearing the program.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5A is a data structure stored in the project management tool in accordance with an embodiment of the present invention; and FIG. 5B is a data structure stored in the data files in accordance with an embodiment of the present invention.

DETAILED DESCRIPTION OF THE PREFERRED EMBODIMENTS

Figure 1:
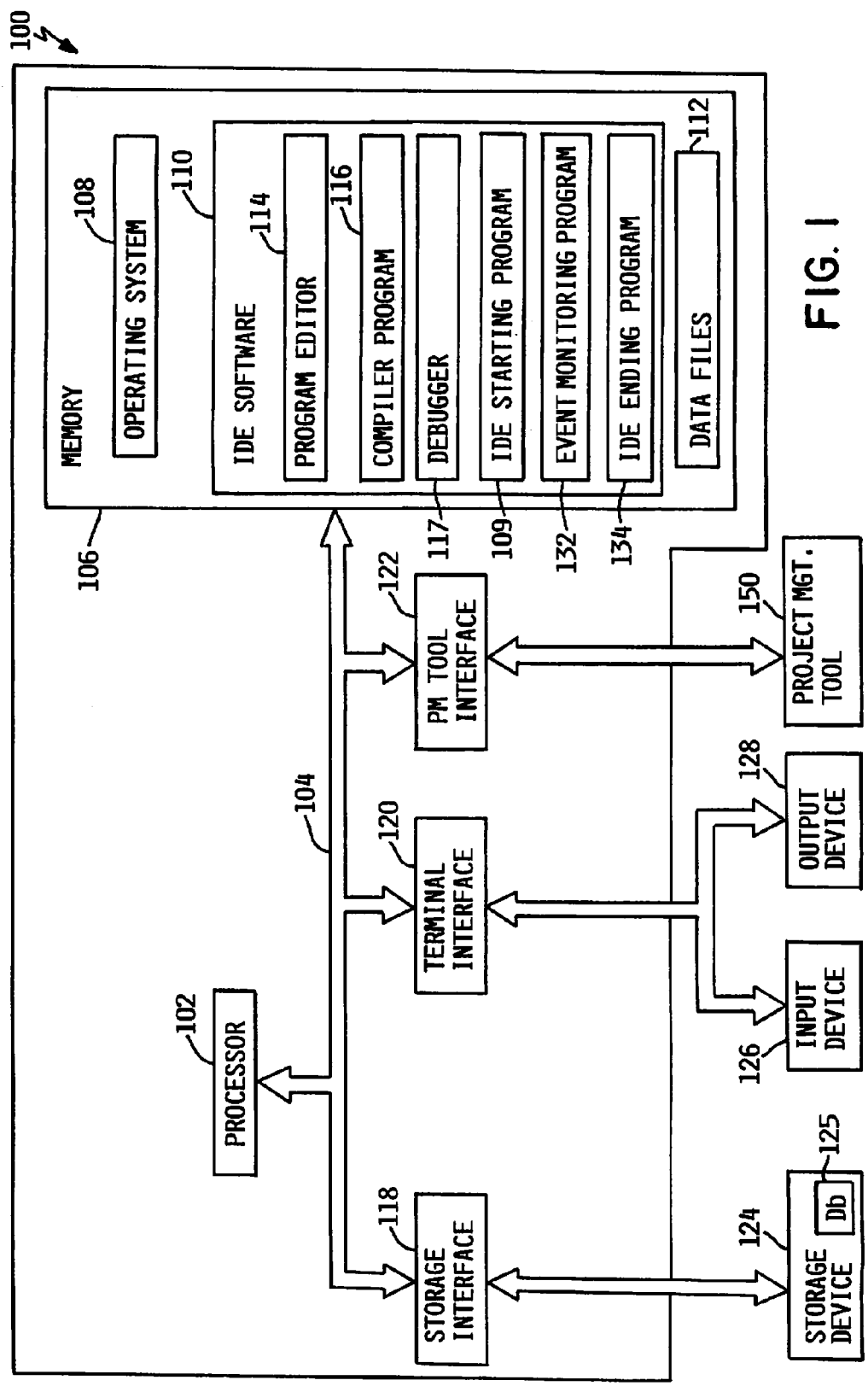
FIG. 1 is a computer system illustratively utilized in accordance with the invention.

The present invention is generally directed to a method of managing a task in an IDE. In one embodiment, the present invention measures the time expended for each task. In another embodiment, the present invention alerts a developer of tasks that their project manager deems critical. The developer may be alerted by a highlighting feature. In one embodiment, the status field for those tasks is highlighted in color. In yet another embodiment, the present invention provides a way for the developer to confirm or validate the time he has expended for a task.

One embodiment of the invention is implemented as a program product for use with a computer system such as, for example, the computer system 100 shown in FIG. 1 and described below. The program(s) of the program product defines functions of the embodiments (including the methods described below with reference to FIGS. 2-4) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In some embodiments, the present invention is implemented for an IDE environment, such as a IBM's Visual Age® for Java®. As an object-oriented programming language, Java includes the constructs of class, object, member variables and methods. In an IDE environment, a package contains a group of classes. Every class consists of a template for defining the characteristics of a specific set of data structures and routines. The variables and routines defined by the class are respectively known as member variables and methods. When a program wishes to use those specific data structures and routines, the program instantiates the class, thereby creating an object of the class. Each object, therefore, is an instance of a particular class or subclass with the class's own methods and data variables. The methods provide the computer instructions that manipulate the data contained in the object. However, the present invention is not limited to IDE environments using object oriented languages. Rather, the invention may be used to advantage in any environment presenting similar conditions and elements as those described therein with respect to the IDE.

FIG. 1 depicts a computer system 100 illustratively utilized in accordance with the invention. The computer system 100 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 100 is an IBM eServer iSeries 400 available from International Business Machines of Armonk, N.Y.

In some embodiments, the computer system 100 comprises a standalone device. However, the computer system 100 may also comprise a device coupled to a computer network system. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer system 100 includes at least one processor 102, which obtains instructions and data from a main memory 106 via a bus 104. The computer system 100 is generally coupled to a number of peripheral devices. Illustratively, the computer system 100 is coupled to a storage device 124, input devices 126, and output devices 128. Each of the peripheral devices is coupled to the computer system via respective interfaces. For example, the computer system 100 is coupled to the storage device 124 via a storage interface 118, and is coupled to the input device 126 and the output device 128 via a terminal interface 120. The computer system 100 may further be coupled to support circuits, which include devices that support the operation of the computer system 100. Examples of support circuits include a power supply, a clock and the like.

In one embodiment, the computer system 100 is also coupled to a project management tool 150 through an interface 122. In one embodiment, the project management tool 150 is located in a local server. In another embodiment, the project management tool 150 is located at a remote client's personal computer. In yet another embodiment, the project management tool 150 resides on the computer system 100. The project management tool 150 typically includes a database for containing data associated with the project. Details of the data structure contained in the project management tool 150 will be described in detail with reference to FIG. 5A. Details of the communication between the computer system 100 and the project management tool 150 will be described in the following paragraphs.

The input device 126 can be any device adapted to give input to the computer system 100, for example, a keyboard, keypad, light-pen, touch-screen, track-ball, or speech recognition unit. The output device 128 is preferably any conventional display screen (e.g., computer monitor). Although shown separately from the input device 126, the output device 130 and input device 126 could be combined. For example, a display screen with an integrated touch-screen, and a display with an integrated keyboard or a speech recognition unit combined with a text speech converter could be used. In one embodiment, the storage device 124 is a direct access storage device (DASD). In another embodiment, the storage device 124 includes a database 125. Although it is shown as a single unit, it could be a combination of fixed and/or removable storage devices, such as fixed disc drives, floppy disc drives, tape drives, removable memory cards or optical storage.

The main memory 106 may comprise one or a combination of memory devices, including Random Access Memory (i.e., RAM), nonvolatile or backup memory, (e.g., programmable or Flash memories, read-only memories, and the like). In addition, the main memory 106 may include memory physically located elsewhere in a computer system 100, for example, any storage capacity used as virtual memory or stored on a mass storage device or on another computer coupled to the computer system 100 via bus 104. While the main memory 106 is shown as a single entity, it should be understood that main memory 106 may in fact comprise a plurality of modules, and that the main memory 106 may exist at multiple levels, from high speed registers and caches to lower speed but larger DRAM chips. Further, the main memory 106 and storage device 124 could be part of one virtual address space spanning multiple primary and secondary storage devices.

The main memory 106 is shown configured with an operating system 108. The operating system 108 is the software used for managing the operation of the computer system 100. Examples of the operating system 108 include IBM OS/400, UNIX, Microsoft Windows and the like.

The main memory 106 further includes an Integrated Development Environment (IDE) software 110 which includes programming that enables a programmer to develop computer programs and software. In addition, the main memory 106 may contain various data files 112 used with the IDE software 110. The data files 112 include any file used or created while executing the IDE software 110. Examples of the data files 112 include source code, object code, byte codes, output data, and the like. The source code may be written in a programming language such as C, C++, Pascal, Java, and the like. Various embodiments of data structures stored in the data files 112 are illustrated in FIGS. 5A and 5B.

In one embodiment, the IDE software 110 includes a program editor 114, a compiler program 116, an IDE starting program 109, an IDE ending program 134, and an event monitoring program 132. The program editor 114 is a software application that enables a programmer to write and edit computer programs in the form of source code. In one embodiment, the editor 114 is adapted to display prompts received from the project management tool 150 to inquire certain inputs from the developer or programmer. The editor 114 may be any type of editor adapted to output the source code and to display prompts on the output device 128, which may be a computer monitor. The compiler 116 is a software program that interprets and converts the source code into object code. The compiler 116 then compiles the source code into object code. The object code comprises one or more programs or files used by the operating system 108 or an application program (not shown). The IDE software 110 may also include a debugger 117 configured for debugging the source code. The IDE starting program 109 is a software application that is activated when the IDE software 110 is activated. The IDE ending program 134 is a software application that is activated when the IDE software 110 is terminated. The event monitoring program 132 is configured to monitor the duration of each event for each task. The IDE starting program 109, the IDE ending program 134 and the event monitoring program 132 are configured to assist a project manager in managing his/her project. In one embodiment, the IDE starting program 109, the IDE ending program 134 and the event monitoring program 132 are configured to alert the developer responsible for completing the set of tasks that are critical to the project. In another embodiment, the IDE starting program 109, the IDE ending program 134 and the event monitoring program 132 are configured to keep track of the time spent on each task.

Figure 2:
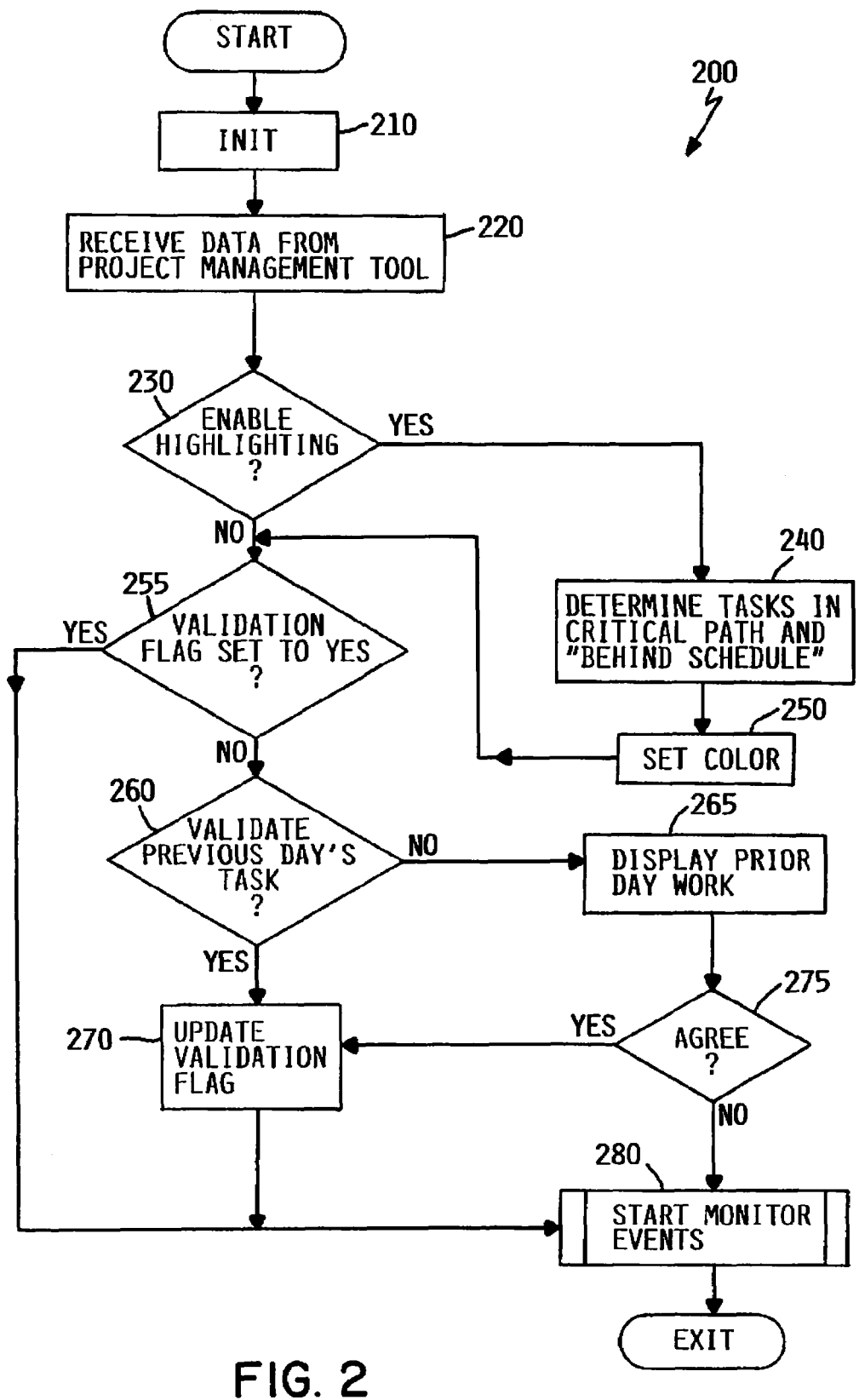
FIG. 2 is a process illustrative of an operation of the IDE starting program in accordance with an embodiment of the present invention.

Referring now to FIG. 2, a process 200 illustrative of an operation of the IDE starting program 109 in accordance with an embodiment of the present invention is shown. At step 210, the IDE software 110 is initialized. After the initialization step, a set of data regarding each task is received from a project management tool, such as the project management tool 150 (at step 220). The set of data may include information, such as the name of the project, the description of the task, the developer responsible for completing the task, an identifier associated with each task, the total duration of the task, and whether the task is a critical task. In one embodiment, the set of data is stored in the data files 112. A data structure in accordance with an embodiment of the set of data is illustrated in FIG. 5A, which will be described in detail in the following paragraphs.

At step 230, a determination is made as to whether the highlighting feature has been enabled. In one embodiment, the highlighting feature is configured to alert the developer of tasks meeting a certain criteria. If the highlighting feature is enabled, the particular tasks that meet the certain criteria are identified (at step 240). Such criteria may include tasks that are in a critical path, for instance. Tasks in a critical path are those tasks that are in a sequence of dependency. That is, certain tasks that are to be completed in the later stages of the sequence depend on other tasks that are to be completed in the earlier stages of the sequence. The later tasks cannot be completed until the earlier tasks are completed. These tasks are therefore identified as being in a critical path. Other criteria may include tasks that are behind schedule. The present invention is not limited by the criteria described here. The criteria may also vary from one project to another. In accordance with an embodiment of the invention, the developer may be given the option to enable the highlighting feature (at step 230). In accordance with another embodiment, the determination as to whether the highlighting feature is enabled is predefined by the project management tool 150.

Once the tasks that meet the certain criteria have been determined, at step 250, the color scheme for the highlighting feature is selected. In accordance with an embodiment of the present invention, the developer is given the option to select the color scheme for the highlighting feature. In accordance with another embodiment, the color scheme for the highlighting feature is predefined by the project management tool 150. In one embodiment, the color red may be designated for those tasks that need special attention, such as those tasks that are behind schedule or that are in the critical path. In another embodiment, the color green may be designated for those tasks that are on or ahead of schedule. The discussion of the various colors is not intended to limit the embodiments of the present invention. Other colors may be used in conjunction with the highlighting feature.

Referring back to step 230, if the highlighting feature is not enabled, then processing proceeds to step 255 where a determination is made as to whether a flag indicating that a particular portion of a task has been completed by the developer on the previous working day is set to yes. If the validation flag is set to yes, processing continues to step 280, which will be described in the following paragraphs. The validation flag may be used by a project manager to indicate to them that the developer has confirmed or validated that the particular portion of the task was performed on the previous working day. Once the flag is set to yes, the project manager can proceed to bill or invoice the client for that portion of a task that has been completed. If the validation flag is not set to yes, then, at step 260, an inquiry is made to the developer as to whether he/she would now validate or confirm the particular portion of a task completed on the previous day. If the developer responds affirmatively, then the validation flag is updated by setting the flag to yes (at step 270). Processing then continues to step 280, which will be described in detail in the following paragraphs. In one embodiment, at step 260, the developer is given the option to validate/confirm the particular portion of all the tasks he/she completed on the previous day.

If the developer responds negatively to the inquiry at step 260, then at step 265, the details and/or description of the particular portion of the task completed on the previous day are displayed to the developer. At step 275, the developer is given a second chance to validate the particular portion of the task performed the previous day. If the developer responds affirmatively, the validation flag is updated by setting the flag to yes (at step 270). Processing then proceeds to step 280. If the developer responds negatively at step 275, processing then continues to step 280. In one embodiment, if the developer responds negatively, then a message is sent to his project manager alerting him/her of the developer's negative response.

At step 280, an event-monitoring program 132 in accordance with an embodiment of the present invention is initiated. The event-monitoring program 132 is configured to monitor events occurring in the IDE. An event is defined as any action or signal by the developer, such as saving a code. In one embodiment, each task is defined by a plurality of events.

Figure 3:
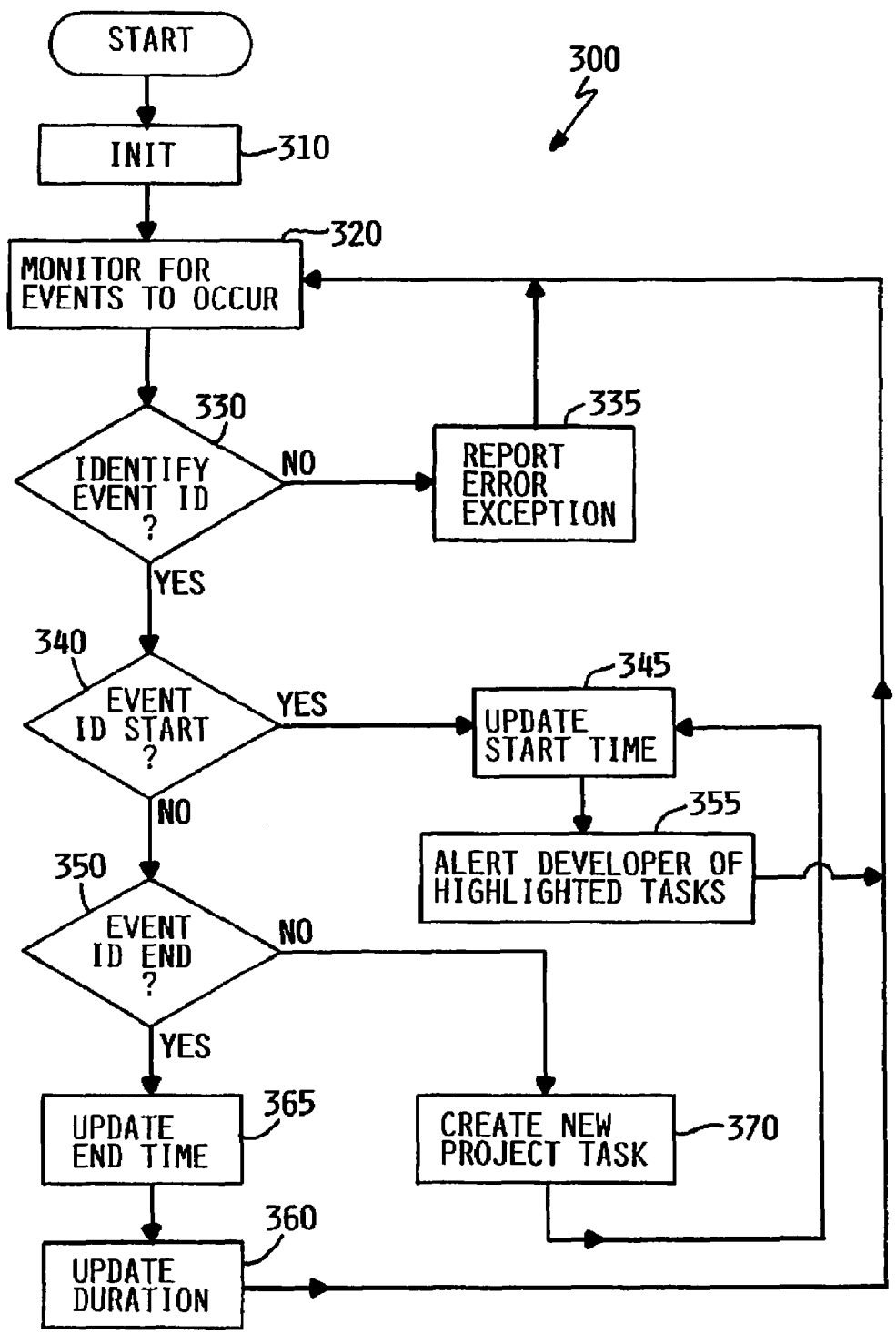
FIG. 3 is a process illustrative of the event-monitoring program in accordance with an embodiment of the present invention.

Referring now to FIG. 3, a process 300 illustrative of the event-monitoring program 132 in accordance with an embodiment of the present invention is shown. At step 310, the process 300 is initialized. During initialization, the process 300 conducts certain initializing activities, such as determining whether event listeners have been activated and determining whether access to the appropriate data structures has been opened. At step 320, the process 300 waits for an event to initiate. Once an event is initiated, then a determination is made as to whether the event has a recognizable corresponding event identifier (at step 330). In the integrated development environment, embodiment each task has a corresponding event identifier. The identifier may be a unique number or written text describing the event. In accordance with an embodiment of the present invention, each task in the project management tool 150 is associated with its corresponding identifier. In one embodiment, at step 330, a determination is made as to whether the identifier matches with one that is stored in the data files 112. If the event does not have a recognizable corresponding event identifier, then an error message is displayed to the developer (at step 335). Processing then returns to step 320, in which the process 300 waits for the next event to occur. In one embodiment, the error message is displayed to the developer through a window.

If the event does have a recognizable event identifier, then a determination is made as to whether the identifier indicates a beginning of an event (at step 340). If so, the current time is recorded as a start time for the event (at step 345). At step 355, if the highlighted feature is enabled (at step 230) and if the task corresponding to the identifier meets a certain criteria (at step 240), the developer is alerted by the highlighting feature. In one embodiment, the status bar associated with the task is displayed in accordance to the highlighted feature. For instance, if the task is in a critical path or behind schedule, the status bar would be highlighted in red. On the other hand, if the task is not in a critical path or is ahead of schedule, then the status bar would be highlighted in green. In this manner, the highlighting feature enables the developer to quickly prioritize his list of tasks, i.e., to determine which tasks are critical and which tasks are not critical. The status bar will be further discussed with reference to FIG. 5A. Following step 355, processing returns to step 320, in which the process 300 waits for the next event to occur.

Referring back to step 340, if the event identifier does not indicate a beginning of an event, then a determination is made as to whether the identifier indicates an end of an event (at step 350). If so, the current time is recorded as the end time for the event (at step 365). At step 360, the time duration of the event is calculated. In one embodiment, the start time for the event is subtracted from the end time for the event. Other processing may take place following step 360, such as, updating the total duration field in the data files 112 and deactivating the highlighting feature for this event, if enabled. Processing then returns to step 320, in which the process 300 waits for the next event to occur.

Referring back to step 350, if the identifier does not indicate an end of an event, then it is determined that the event is a predefined event in the IDE but has not been recorded in the project management tool 150. Therefore, the developer will be given the opportunity to create a new task (at step 370). In one embodiment, the developer is given the opportunity to enter the name for the new task, its description and whether or not the highlighting feature is enabled. In another embodiment, project classes and packages are assigned to the new task. In yet another embodiment, processing returns to step 320 if the developer decides not to create a new task. If a new task is created, then the current time is recorded as the start time for the new event (at step 345).

Figure 4:
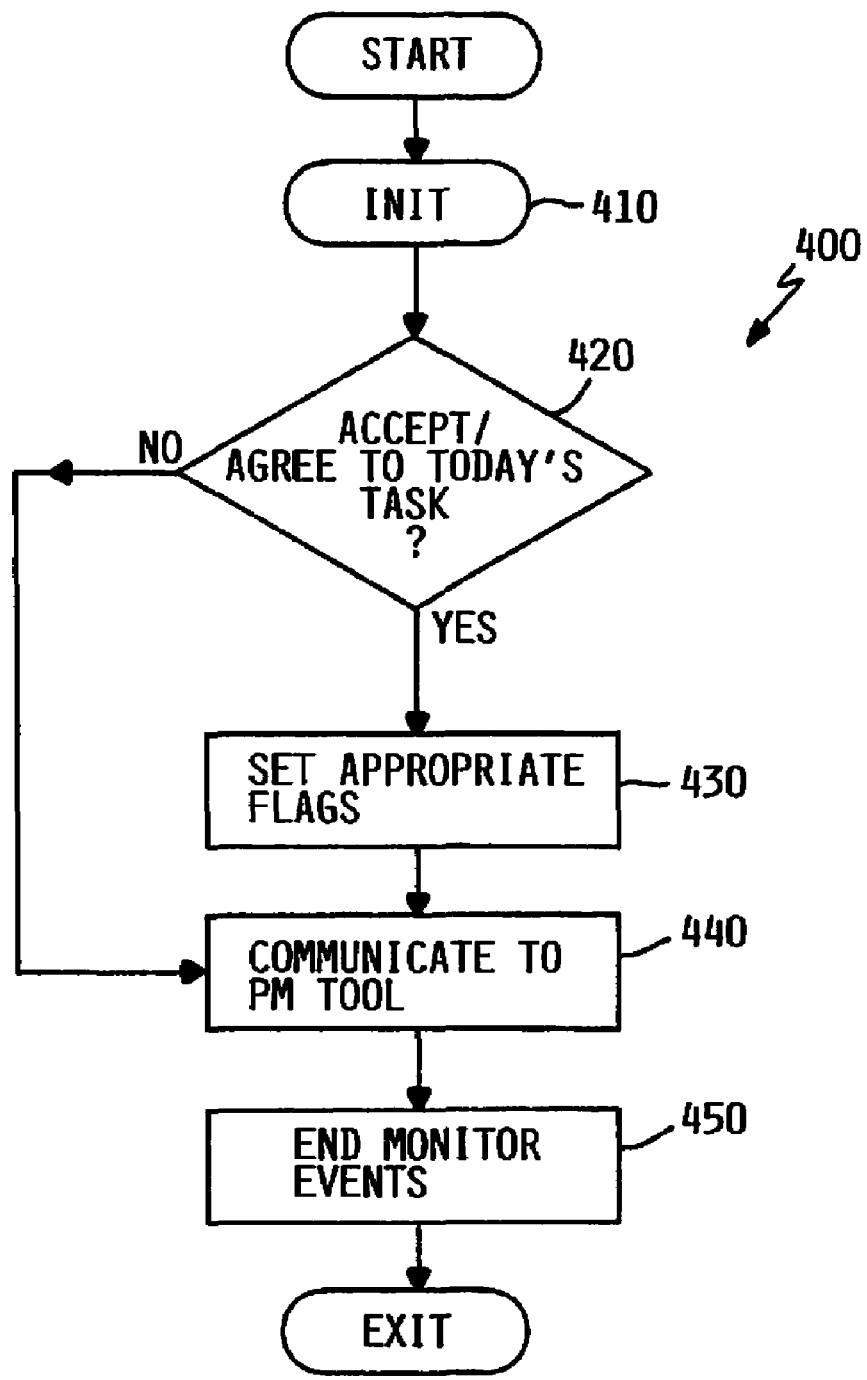
FIG. 4 is a process illustrative of an operation of the IDE ending program in accordance with an embodiment of the present invention.

At the end of the day, after the developer has completed a number of tasks, he/she typically exits out of the IDE software 110. An embodiment of the present invention is directed to a process for exiting out of the IDE software 110. FIG. 4 is a process 400 illustrative of an operation of the IDE ending program 111 in accordance with an embodiment of the present invention. At step 410, the process 400 is initiated. In one aspect, prior to closing the IDE software 110 and all the programs contained therein, certain shut down operations are performed, such as closing and saving files, closing links, deactivating any active dialog modem, etc. At step 420, an inquiry is made to the developer as to whether he/she would now validate or confirm all the events he/she just completed. If the developer responds affirmatively, then the validation flag is set to yes (at step 430). In one embodiment, the developer is given the option to selectively validate or confirm the particular events he/she just completed. Processing then continues to step 440, which will be described in details in the following paragraphs. If the developer responds negatively, then processing continues to step 440.

At step 440, the set of data stored in the data files 112 that have been updated are transferred to the project management tool 150. The updated data may include the total duration of the event, the validation flag, and any newly created task, if any. In this manner, the data in the project management tool 150 are updated with the updated data stored in the data files 112. At step 450, the event-monitoring program 132 is terminated.

Referring now to FIG. 5A, a data structure 500 stored in the project management tool 150 in accordance with an embodiment of the present invention is shown. The data structure 500 includes a series of fields, such as the name of the task (task name 510), the event identifier 520, the date 530, the description of the task 540, the status of the task 550, the highlighting color 560, the total duration for the task 570 and the validation flag 580. Data in the task name field 510 is configured to indicate the name of the task, e.g., unit test. Data in the event identifier field 520 is configured to indicate a unique message (number or text) associated with each task. Data in the date field 530 is configured to indicate the date corresponding with the status of the task and the total duration. Data in the status of task field 550 is configured to indicate the status of the task on that particular date. In one embodiment, data in the status of task field 550 indicates whether the task is in critical path or whether the task is ahead or behind schedule. Data in the highlighting color field 560 is configured to indicate the color selected to highlight the task, if the highlighting feature is enabled. Data in the total duration field 570 is configured to indicate the amount of time expended on the task as to date. Data in the validation flag field 580 is configured to indicate the developer's validation of the portion of the task he has performed as to date. In accordance with an embodiment of the invention, data in each field is copied to the data files 112, at step 220. In accordance with another embodiment of the invention, the data stored in the data files 112 that have been updated are transferred to the corresponding fields in the data structure 500, at step 440.

Referring now to FIG. 5B, a data structure 505 stored in the data files 112 in accordance with an embodiment of the present invention is shown. The data structure 505 is configured to keep track of the amount of time expended for each event and for each task. The data structure 505 includes a series of fields, such as the event identifier 515, the start time 525, the end time 535, the duration for this invocation 545 and the total duration for the task 555. The event identifier field 515 is a duplicate of the event identifier field 520 described above. The event identifier field 515 is, therefore, configured to indicate a unique message associated with each task. The start time field 525 is configured to indicate the time at which an event started. The end time field 535 is configured to indicate the time at which the event ended. The duration for this invocation field 545 is configured to indicate the duration of time expended for that event. The total duration field 555 is configured to keep track of how much time has been expended for each task. In accordance with an embodiment of the invention, the start time field 525 is updated at step 345 described in FIG. 3. In accordance with another embodiment of the invention, the end time field 535 is updated at step 365 described in FIG. 3. In accordance with yet another embodiment of the invention, the duration for this invocation field 545 is updated at step 360 described in FIG. 3. The total duration field 555 may also be updated at step 360.

Persons skilled in the art will recognize that embodiments of the present invention have application in a variety of environments and contexts. For example, in one embodiment, the project management tool 150 is, or comprises, a timekeeping software product. In this context, the project management tool 150 is any timekeeping software capable of tracking time expended on a particular task or group of tasks being performed within a development environment (e.g., an integrated development environment). In one embodiment, each task for which time must be kept is assigned an identifier. In response to a task event (indicating that some action is being taken with respect to a task), the respective identifier is provided to the project management tool 150, thereby invoking the project management tool 150 to begin tracking expended time for the task.

One environment in which the foregoing embodiment may be used to advantage is the legal environment. While aspects will be described in the context of the legal environment, it is understood that application to any other environment (e.g., software development, accounting, etc.) is contemplated. In the legal context, a task may be the preparation of a legal document (e.g., a motion, a brief, etc.) having an associated task identifier. In one embodiment, the associated identifier is particular to a client and a matter (where a matter may be, for example, preparation for trial, drafting a patent application, drafting a response to an office action, etc.) for the client. Two or more associated task identifiers may be related to a common project (e.g., a particular trial) but each identifying separate tasks for the project. In response to a task event for the legal document (e.g., opening and displaying the legal document, making active a window displaying the legal document, etc.), the associated identifier for the legal document is provided to the project management tool 150. In response to receiving associated identifier(s), the project management tool 150 begins tracking time expended working on the legal document. In this manner, the task event is associated with one or more task identifiers. In one embodiment, associating the task event with one or more task identifiers may not occur in response to receiving, by the project management, the one or more task identifiers. Rather, the project management may receive a plurality of task identifiers and, subsequently, associate the task event with one or more task identifiers by detecting the task event, determining an event identifier associated with the event and correlating the event identifier to the one or more task identifiers. In any case, the occurrence of a predefined event causes the project management tool to begin tracking time for a task.

While the foregoing is directed to embodiments of the present invention, other and further embodiments of the invention may be devised without departing from the basic scope thereof, and the scope thereof is determined by the claims that follow.

What is claimed is:

1. A computer implemented method of managing a task of a project using a project management tool, the task comprising a plurality of events, the method comprising:

provide a set of data from a project management tool to an integrated development environment (IDE) application, the set of data comprising an identifier corresponding to a software development task to be completed by one or more users of the IDE application, and the set of data further comprising an indication of one or more user activities associated with the software development task for the IDE application to monitor how much time is expended to perform respective activities by respective users of the IDE application; wherein the project management tool and the IDE application are executing on one or more computer processors; and managing progress of the software development task associated with the identifier wherein managing the progress of the software development task comprises:

(a) receiving, from the IDE application, an amount of time expended on the software development task associated with the identifier; the amount of time having been automatically measured by the IDE application according to an operation executing on one or more computer processors, the operation comprising:

automatically monitoring a respective user activity related to each of a plurality of events related to the software development task, the monitoring comprising measuring a respective time period of each of the monitored user activities;

summing the respective time periods to produce the amount of time expended on the software development task associated with the identifier; and prompting each respective user to confirm the respective time periods expended on at least one of the activities associated with the software development task;

(b) based on the amount of time received from the IDE application, visually identifying, in a user interface of the project management tool, the software development task as being at least one of: (i) behind schedule; and (ii) in a critical path for completion of the project, whereby the software development task is distinguished as being relatively more critical to project completion as compared to other software development tasks not in the critical path; and (c) receiving, from the IDE application, an indication to switch a validation flag corresponding to the software development task from a first value to a second value, the second value indicating completion of the software development task, wherein the indication to switch the validation flag is received from the IDE application as a result of a validation operation performed by the IDE application, comprising:
  issuing an inquiry signal regarding a validation of an amount of time expended on the software development task;
  receiving a response signal indicating whether the amount of time expended has been validated; and
  storing the second value in response to the response signal.

2. The method of claim 1, wherein each respective time period of each of the monitored user activities is measured by starting a timer at a beginning of the respective user activity and terminating the timer at an end of the respective user activity.

3. The method of claim 1, wherein managing the progress of the software development task comprises: displaying, in the user interface of the project management tool, at least one data of the set of data in a distinctive manner relative to other data in the set to indicate that the software development task associated with the at least one data has met a certain criteria.

4. The method of claim 1, wherein managing the progress of the software development task further comprises displaying, in the user interface of the project management tool, at least one data of the set of data in a distinctive manner relative to other data in the set to indicate that the software development task associated with the at least one data has met a certain criteria, the at least one data corresponding to a status field for indicating a status of the software development task.

5. The method of claim 1, wherein visually identifying comprises displaying at least one data of the set of data in a highlighted color to indicate that the software development task associated with the at least one data has met a certain criteria, the certain criteria being defined as one of the software development task being in the critical path and the software development task being behind schedule.

6. A computer-readable storage medium containing a program which, when executed by a processor, performs an operation for managing a task of a project in a project management environment, the task comprising a plurality of events, the operation comprising:
  providing a set of data from a project management tool to an integrated development environment (IDE) application, the set of data comprising an identifier corresponding to a software development task to be completed by one or more users of the IDE application, and the set of data further comprising an indication of one or more user activities associated with the software development task for the IDE application to monitor how much time is expended to perform respective activities by respective users of the IDE application; and
  managing progress of the software development task associated with the identifier wherein managing the progress of the software development task comprises:
    (a) receiving, from the IDE application, an amount of time expended on the software development task associated with the identifier; the amount of time having been automatically measured by the IDE application according to an operation comprising:
      automatically monitoring a respective user activity related to each of a plurality of events related to the software development task, the monitoring comprising measuring a respective time period of each of the monitored user activities;
      summing the respective time periods to produce the amount of time expended on the software development task associated with the identifier; and
      prompting each respective user to confirm the respective time periods expended on the software development task;
    (b) based on the amount of time received from the IDE application, visually identifying, in a user interface of the project management tool, the software development task as being at least one of: (i) behind schedule; and (ii) in a critical path for completion of the project, whereby the software development task is distinguished as being relatively more critical to project completion as compared to other software development tasks not in the critical path; and
    (c) receiving, from the IDE application, an indication to switch a validation flag corresponding to the software development task from a first value to a second value, the second value indicating completion of the software development task, wherein the indication to switch the validation flag is received from the IDE application as a result of a validation operation performed by the IDE application, comprising:
      issuing an inquiry signal regarding a validation of an amount of time expended on the software development task;
      receiving a response signal indicating whether the amount of time expended has been validated; and
      storing the second value in response to the response signal.

7. The computer-readable storage medium of claim 6, wherein each respective time period of each of the monitored user activities is measured by starting a timer at a beginning of the respective user activity and terminating the timer at an end of the respective user activity.

8. The computer-readable storage medium of claim 6, wherein managing the progress of the software development task further comprises: displaying, in the user interface of the project management tool, at least one data of the set of data in a distinctive manner relative to other data in the set to indicate that the software development task associated with the at least one data has met a certain criteria.

9. The computer-readable storage medium of claim 6, wherein managing the progress of the software development task comprises displaying, in the user interface of the project management tool, at least one data of the set of data in a distinctive manner relative to other data in the set to indicate that the software development task associated with the at least one data has met a certain criteria, the at least one data corresponding to a status field for indicating a status of the software development task.

10. The computer-readable storage medium of claim 6, wherein visually identifying comprises displaying at least one data of the set of data in a highlighted color to indicate that the software development task associated with the at least one data has met a certain criteria, the certain criteria being defined as one of the software development task being in the critical path and the software development task being behind schedule.

11. A computer system, comprising:
  a memory containing a project management tool program; and
  a processor which, when executing the project management tool program, performs an operation comprising:

providing a set of data from a project management tool to an integrated development environment (IDE) application, the set of data comprising an identifier corresponding to a software development task to be completed by one or more users of the IDE application, and the set of data further comprising an indication of one or more user activities associated with the software development task for the IDE application to monitor how much time is expended to perform respective activities by respective users of the IDE application; and managing progress of the software development task associated with the identifier wherein managing the progress of the software development task comprises:

(a) receiving, from the IDE application, an amount of time expended on the software development task associated with the identifier; the amount of time having been automatically measured by the IDE application according to an operation comprising:

automatically monitoring a respective user activity related to each of a plurality of events related to the software development task, the monitoring comprising measuring a respective time period of each of the monitored user activities;

summing the respective time periods to produce the amount of time expended on the software development task associated with the identifier; and prompting each respective user to confirm the respective time periods expended on the software development task;

(b) based on the amount of time received from the IDE application, visually identifying, in a user interface of the project management tool, the software development task as being at least one of: (i) behind schedule; and (ii) in a critical path for completion of the project, whereby the software development task is distinguished as being relatively more critical to project completion as compared to other software development tasks not in the critical path; and (c) receiving, from the IDE application, an indication to switch a validation flag corresponding to the software development task from a first value to a second value, the second value indicating completion of the software development task, wherein the indication to switch the validation flag is received from the IDE application as a result of a validation operation performed by the IDE application, comprising:

issuing an inquiry signal regarding a validation of an amount of time expended on the software development task;

receiving a response signal indicating whether the amount of time expended has been validated; and storing the second value in response to the response signal.

12. The computer system of claim 11, wherein each respective time period of each of the monitored user activities is measured by starting a timer at a beginning of the respective user activity and terminating the timer at an end of the respective user activity.

13. The computer system of claim 11, wherein managing the progress of the software development task comprises: displaying, in the user interface of the project management tool, at least one data of the set of data in a distinctive manner relative to other data in the set to indicate that the software development task associated with the at least one data has met a certain criteria.

14. The computer system of claim 11, wherein managing the progress of the software development task comprises displaying, in the user interface of the project management tool, at least one data of the set of data in a distinctive manner relative to other data in the set to indicate that the software development task associated with the at least one data has met a certain criteria, the at least one data corresponding to a status field for indicating a status of the software development task.

15. The computer system of claim 11, wherein visually identifying comprises displaying at least one data of the set of data in a highlighted color to indicate that the software development task associated with the at least one data has met a certain criteria, the certain criteria being defined as one of the software development task being in the critical path and the software development task being behind schedule.

* * * * *